United States Patent
Balakrishnan et al.

(10) Patent No.: US 7,440,491 B2
(45) Date of Patent: Oct. 21, 2008

(54) ULTRA-WIDEBAND COMMUNICATIONS SYSTEM DEVICES

(75) Inventors: Jaiganesh Balakrishnan, Dallas, TX (US); Anuj Batra, Dallas, TX (US); Anand G. Dabak, Plano, TX (US); Abdellatif Bellaouar, Dallas, TX (US); Paul H. Fontaine, Richardson, TX (US); Michel Frechette, Plano, TX (US); Ranjit Gharpurey, Ann Arbor, MI (US); Heng-Chih Lin, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 649 days.

(21) Appl. No.: 10/759,480

(22) Filed: Jan. 16, 2004

(65) Prior Publication Data

US 2004/0146092 A1    Jul. 29, 2004

Related U.S. Application Data

(60) Provisional application No. 60/440,545, filed on Jan. 16, 2003.

(51) Int. Cl.
    *H04B 1/00* (2006.01)
(52) U.S. Cl. ........................ 375/148; 375/137; 375/147; 375/316; 375/324; 375/349; 341/122
(58) Field of Classification Search ................ 375/147, 375/130, 218, 295, 219, 137, 316, 324, 349, 375/148; 341/122
    See application file for complete search history.

(56) References Cited

U.S. PATENT DOCUMENTS

| | | | |
|---|---|---|---|
| 5,640,698 A * | 6/1997 | Shen et al. .................. 455/323 |
| 6,597,299 B1 * | 7/2003 | Bugeja ........................ 341/122 |
| 6,616,254 B1 * | 9/2003 | Raphaeli et al. ............. 375/135 |
| 6,700,939 B1 * | 3/2004 | McCorkle et al. ........... 375/295 |
| 6,763,057 B1 * | 7/2004 | Fullerton et al. ............ 375/141 |
| RE38,603 E * | 9/2004 | Kim et al. ................... 375/141 |
| 7,346,136 B1 * | 3/2008 | Aiello ........................ 375/347 |
| 2001/0033611 A1 * | 10/2001 | Grimwood et al. .......... 375/219 |
| 2002/0012409 A1 * | 1/2002 | Kazakevich et al. ........ 375/345 |
| 2002/0064245 A1 * | 5/2002 | McCorkle .................... 375/346 |
| 2004/0008757 A1 * | 1/2004 | Ulupinar et al. ............. 375/148 |
| 2006/0166619 A1 * | 7/2006 | Roberts ........................ 455/39 |

OTHER PUBLICATIONS

FCC, "First Report and Order, In the matter of Revision on Part 15 of the Commuission's Rules Regarding Ultra-Wideband Transmission Systems," Adopted Feb. 14, 2002, Washington, D.C., US.

Kohno, R., et al., "Project: IEEE P802.15 Working Group for Wireless Personal Area Networks (WPANs)", doc.; IEEE 802.15-03/097r1, IEEE P802.15 Alternative PHY Call For Proposals, IEEE P802.15-02/327r7, Japan, Mar. 2003.

* cited by examiner

*Primary Examiner*—Ted Wang
(74) *Attorney, Agent, or Firm*—Ronald O. Nerrings; Wade James Brady, III; Frederick J. Telecky, Jr.

(57) ABSTRACT

System for ultra-wideband communications providing high data rates over an extended operating range in the presence of interferers. A preferred embodiment comprises an ultra-wideband (UWB) device that makes use of a portion of the UWB frequency range to help provide good performance in the presence of interferers. Additionally, since only a portion of the UWB frequency range is used, multiple devices can simultaneously transmit and receive by using different portions of the UWB frequency range.

27 Claims, 4 Drawing Sheets

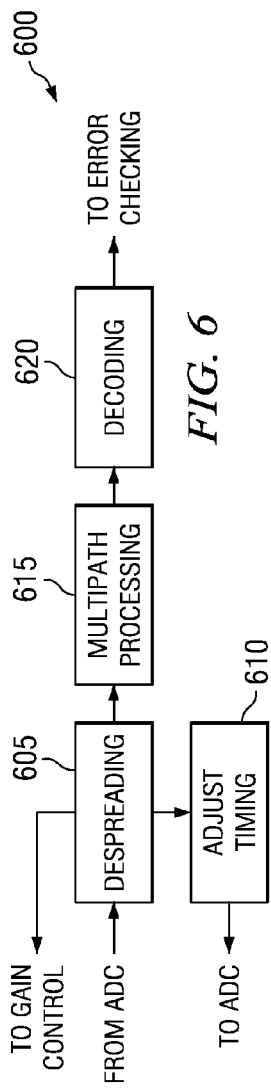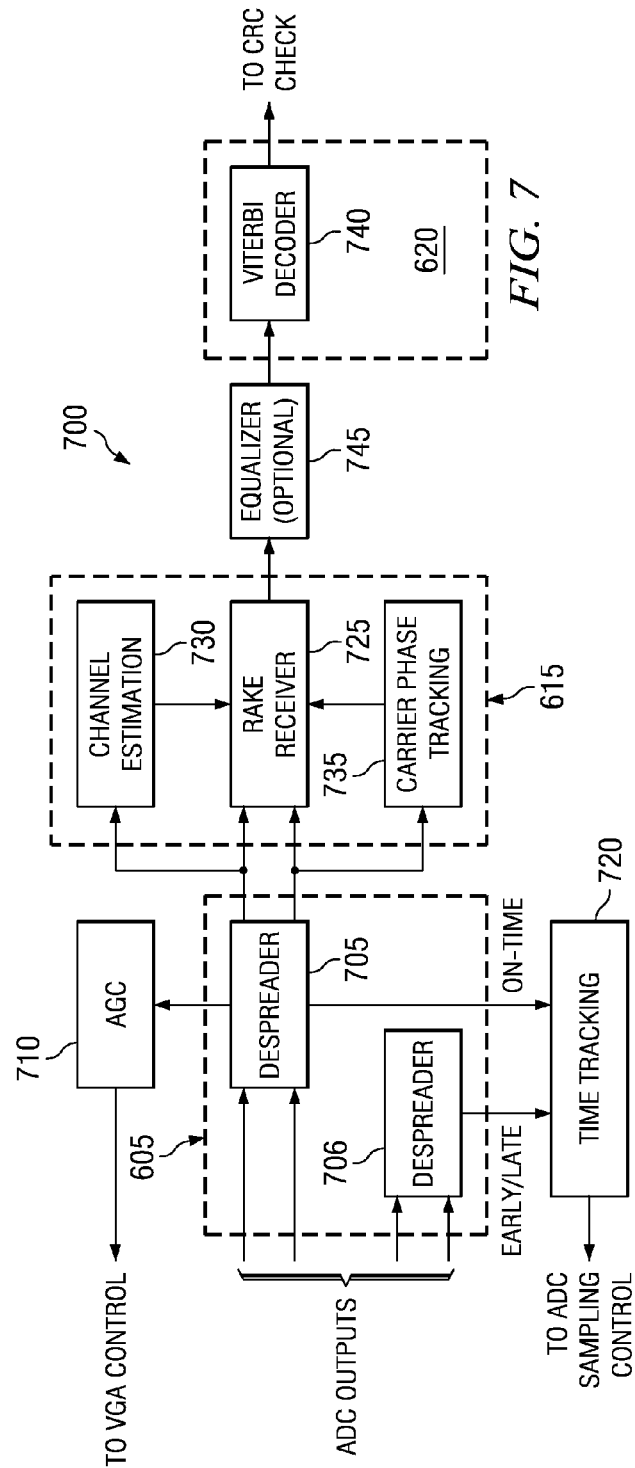

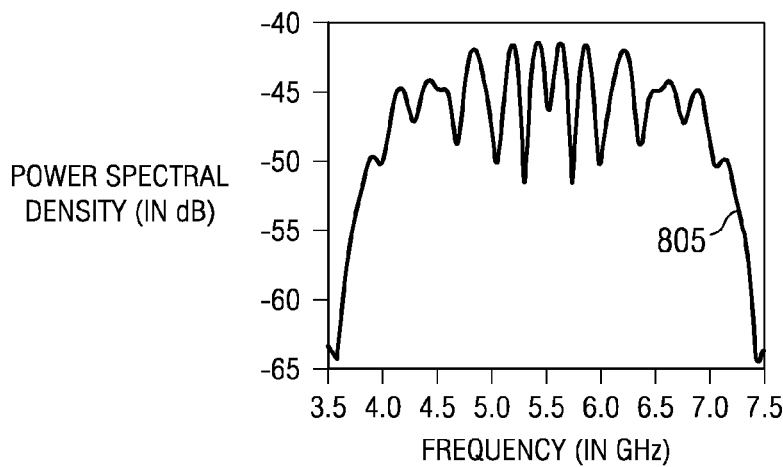

ULTRA-WIDEBAND COMMUNICATIONS SYSTEM DEVICES

This application claims the benefit of U.S. Provisional Application No. 60/440545, filed Jan. 16, 2003, entitled "Comparison of UWB System Architectures", which application is hereby incorporated herein by reference.

CROSS-REFERENCE TO RELATED APPLICATIONS

This application is related to the following co-pending and commonly assigned patent applications: Ser. No. 10/761,605, filed Jan. 21, 2004, entitled "Receiver Sampling in an Ultra-Wideband Communications System."

TECHNICAL FIELD

The present invention relates generally to a system for digital wireless communications, and more particularly to a system for an ultra-wideband communications system providing good data rates over an extended operating range in the presence of interferers.

BACKGROUND

Ultra-wideband (UWB) communications systems are normally defined as carrier-less communications systems wherein the bandwidth of the signal being transmitted, $f_B$, is greater than or equal to 0.20 $f_c$, where $f_c$ is the center frequency of the signal being transmitted. Additionally, the UWB communications system should have a minimum bandwidth of 500 MHz. Note that the definition for UWB communications systems and devices is as defined by the Federal Communications Commission (FCC) of the United States. UWB communications systems have been around for a great number of years, and the majority of them fall under one type of system, they modulate a stream of short-duration pulses (with an approximate duration which ranges from 0.2 nanoseconds (ns) to 2 ns), either in time (pulse position modulation (PPM)), amplitude (pulse amplitude modulation (PAM)), or phase angle (bi-phase modulation).

The FCC, in Report Order 02-48 released in February of 2002, has specified a set of spectral allocation, technical standards, and operating restrictions for several different types of UWB devices. For example, in the Report Order, the FCC specifies that indoor UWB devices may operate within a frequency range of 1.9 to 10.6 GHz while hand-held UWB devices may operate within a frequency range of 3.1 to 10.6 GHz. Within the permitted frequency ranges, the FCC also places a limit upon maximum transmit power. According to the FCC, many types of communications systems can be classified as a UWB communications system if it conforms to the specified spectral allocation, technical standards, and operating restrictions.

A potential source of performance concern for a UWB communications system that makes use of the entire frequency range provided by the FCC (either 1.9 to 10.6 GHz or 3.1 to 10.6 GHz) is that since the frequency range is so large that there can be portions of the frequency range that is in use by other electronic devices. For example, in a frequency range commonly referred to as the Unlicensed National Information Infrastructure (UNII) band, which ranges from 5.15 to 5.825 GHz, there may be a wide variety of electronic devices. Devices operating in the UNII band can transmit at significantly greater power than UWB devices. Therefore, these devices can be sources of interference for UWB devices. Furthermore, UWB devices can also interfere with the UNII devices.

A proposed solution to interference with UNII devices (and other devices) is to use specially designed pulses with no transmission signal in the occupied frequency bands. The use of the specially designed pulses can allow existing UWB communications systems to operate with little to no interference with (and from) devices operating in the occupied frequency bands.

Another proposed solution to interference from other devices is to use a multiband variant of the UWB communications system. In this solution, the UWB frequency range can be divided into multiple frequency bands and the UWB communications system can transmit on different frequency bands as interference is detected.

One disadvantage of the prior art is the multiband solution may not be compatible with existing UWB communications systems. Therefore, in order to provide interference immunity, existing UWB communications systems may need to be replaced with new UWB communications systems that can transmit over different frequency bands.

A second disadvantage of the prior art is that the use of the specially designed pulses can make it difficult to permit multiple different UWB communications systems operating within the general vicinity to establish simultaneous but distinct communications networks since the transmission of the specially designed pulses by a single UWB communications system occupies the entire UWB spectrum and may prevent other UWB communications systems from transmitting.

Another disadvantage of the prior art is that the large operating frequency range (large bandwidth) of existing UWB communications systems can make it difficult to develop and test radio frequency hardware.

SUMMARY OF THE INVENTION

These and other problems are generally solved or circumvented, and technical advantages are generally achieved, by preferred embodiments of the present invention which provides for a system for providing good data rates over an extended operating range with support for multiple cohabitating communications systems.

In accordance with a preferred embodiment of the present invention, an ultra-wideband receiver comprising a filter coupled to a signal input, the filter to pass signals in a frequency band from a received signal provided by the signal input, an amplifier coupled to the filter, the amplifier to bring the passed signals to a signal level compatible with circuitry in the receiver, a demodulating unit coupled to the amplifier, the demodulating unit containing circuitry to bring the passed signals to an internal frequency, a timing generating unit coupled to the demodulating unit, the timing generating unit containing circuitry to generate samples of the passed signals at different timing offsets, and a converter coupled to the timing generating unit, the converter to convert continuous samples produced by the timing generating unit into discrete samples is provided.

In accordance with another preferred embodiment of the present invention, an ultra-wideband transmitter comprising an encoding unit coupled to a data source, the encoding unit containing circuitry to apply a code to data provided by the data source, a spreading unit coupled to the encoding unit, the spreading unit containing circuitry to apply a spreading code to the data, a pulse shaping unit coupled to the spreading unit, the pulse shaping unit containing circuitry to apply mask of a desired pulse with desired frequency characteristics to the encoded and spread data, a modulating unit coupled to the pulse shaping unit, the modulating unit apply a carrier frequency to the shaped, encoded, and spread data, and a filter coupled to the modulating unit, the filter to ensure that the modulated, shaped, encoded, and spread data fit within a desired frequency range is provided.

In accordance with another preferred embodiment of the present invention, an ultra-wideband device comprising an antenna to transmit and receive signals, a switch coupled to the antenna, the switch to control access to the antenna, a receiver coupled to the switch, the receiver comprising a filter coupled to the switch, the filter to pass signals in a frequency band from a received signal provided by the switch, an amplifier coupled to the filter, the amplifier to bring the passed signals to a signal level compatible with circuitry in the receiver, a demodulating unit coupled to the amplifier, the demodulating unit containing circuitry to bring the passed signals to an internal frequency, a timing generating unit coupled to the demodulating unit, the timing generating unit containing circuitry to generate samples of the passed signals at different timing offsets, and a converter coupled to the timing generating unit, the converter to convert continuous samples produced by the timing generating unit into discrete samples, the ultra-wideband device further comprising a transmitter coupled to the switch, the transmitter comprising an encoding unit coupled to a data source, the encoding unit containing circuitry to apply a code to data provided by the data source, a spreading unit coupled to the encoding unit, the spreading unit containing circuitry to apply a spreading code to the data, a pulse shaping unit coupled to the spreading unit, the pulse shaping unit containing circuitry to apply mask of a desired pulse with desired frequency characteristics to the encoded and spread data, a modulating unit coupled to the pulse shaping unit, the modulating unit apply a carrier frequency to the shaped, encoded, and spread data, and a filter coupled to the modulating unit and the switch, the filter to ensure that the modulated, shaped, encoded, and spread data fit within a desired frequency range is provided.

An advantage of a preferred embodiment of the present invention is that with the use of a relatively narrow bandwidth transmission, it can be easier to develop and test radio frequency hardware.

A further advantage of a preferred embodiment of the present invention is that the use of a relatively narrow bandwidth transmission can permit several communications systems to operate within the same general vicinity by having each communications system transmitting within a different portion of the frequency range.

Yet another advantage of a preferred embodiment of the present invention is that if interferers are detected (or are known prior to transmission) within the transmission frequency range, then the transmission can be moved to a different portion of the frequency range to avoid interference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a diagram of digital baseband circuitry of a receiver, according to a preferred embodiment of the present invention;

FIG. 7 is a detailed diagram of digital baseband circuitry of a receiver, according to a preferred embodiment of the present invention;

FIGS. 8a and 8b are diagrams of power spectral density graphs for long and short period spreading sequences, according to a preferred embodiment of the present invention; and FIG. 9 is a diagram of interference mitigating circuitry, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a UWB communications system operating within FCC specified regulations and adherent to IEEE 802.15.3a technical requirements. The FCC specified rules can be found in a Report Order entitled "Revision of Part 15 of the Commission's Rules Regarding Ultra-Wideband Transmission Systems," released Apr. 22, 2002, which is herein incorporated by reference. The IEEE 802.15.3a technical requirements can be found in a document entitled "TG3a Technical Requirements," published 12/27/2002, which is herein incorporated by reference. The invention may also be applied, however, to other UWB communications systems operating within other portions of the world and under different technical and regulatory restrictions. The invention may also be applied, however, to UWB communications systems that use only a portion of the allowed frequency spectrum, not just all of it.

Figure 1:
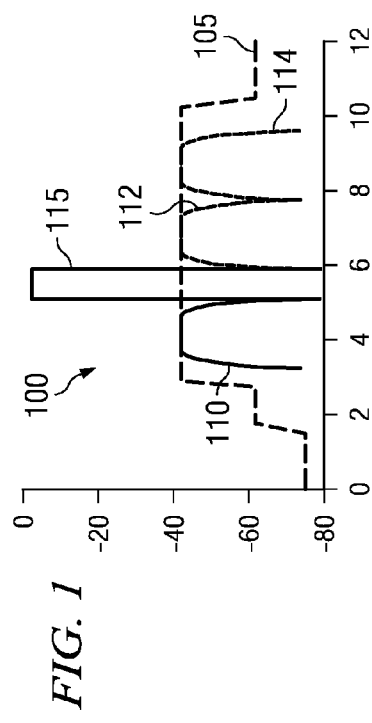
FIG. 1 is a diagram of a frequency spectrum plot for a UWB communications system.

With reference now to FIG. 1, there is shown a diagram illustrating a frequency spectrum plot 100 for a UWB communications system. The frequency spectrum plot 100 displays an FCC spectrum mask 105 for a UWB communications system. According to the FCC, a UWB communications system may operate as long as its transmissions fit inside the spectrum mask 105. The frequency spectrum plot 100 also displays a frequency band 110 for a UWB communications system whose transmissions fit within the spectrum mask 105 but does not use the entire frequency range permitted by the spectrum mask 105. A possible reason for not making use of the entire frequency range is that there is a large interferer 115 that occupies a significant portion of the frequency range. An attempt to make use of the entire frequency range could result in a portion of the transmission being damaged by the large interferer 115. Furthermore, if the large interferer 115 is actually a different communications system, the transmission from the UWB communications system may cause interference with the different communications system.

Since the frequency band 110 does not use the entire frequency band, it may be possible to move the frequency band 110 to other portions of the frequency band, such as above the large interferer 115 (displayed as a second frequency band 112) or even further up the frequency band (displayed as a third frequency band 114). Since the frequency band 110 does not use all of the entire frequency band, it may then be possible for multiple transmissions to take place simultaneously, such as when multiple communications systems operating in close proximity transmit at the same time. If each one of the multiple communications systems transmit within a different portion of the entire frequency band, then the transmissions may not interfere with one another.

According to a preferred embodiment of the present invention, the frequency band 110 can be located at a range of 3.25 to 5.15 GHz. Note that the frequency band 110 may be located at other frequency ranges, such as at frequency ranges as shown by frequency bands 112 and 114, for example. Combined with a pulse repetition frequency (PRF) of one (1), a spreading factor of seven (7), and a 20 dB bandwidth of approximately 2 GHz (1.90 GHz), it can be possible to achieve a data rate of 110 Mbps for UWB devices with a separation of up to approximately nine (9) meters.

Figure 2:
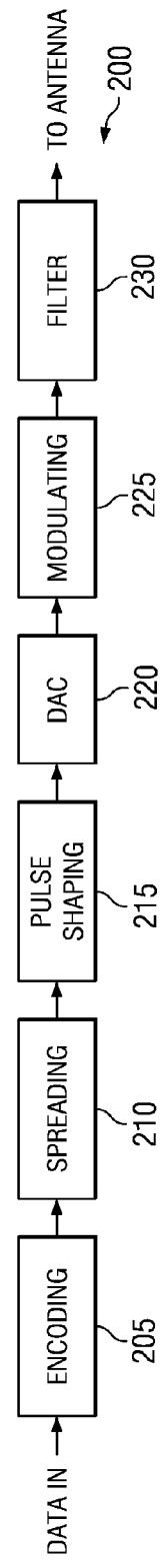
FIG. 2 is a diagram of a portion of a transmitter, wherein the transmitter may be a part of a square-root raised cosine (SRRC) pulse based UWB communications system, according to a preferred embodiment of the present invention.

With reference now to FIG. 2, there is shown a diagram illustrating a portion of a transmitter 200, wherein the transmitter 200 may be part of a square-root raised cosine (SRRC) pulse based UWB communications system, according to a preferred embodiment of the present invention. A data stream (data to be transmitted) can first be encoded by a code, for example, by an encoding unit 205. After encoding, the encoded data stream can be spread by a spreading unit 210, which effectively multiplies the encoded data stream with a spreading code. After being encoded and then spread, the data stream can be pulse shaped by a pulse shaping unit 215, which can ensure that the data that is to be transmitted has the desired frequency domain characteristics (a SRRC pulse in this case).

Conversion into an analog signal is next and may be performed by a digital-to-analog converter (DAC) 220. After conversion into an analog signal, the analog signal can be modulated by a carrier frequency by a modulating unit 225. Finally, prior to transmission, the modulated analog signal may be passed through a filter 230 to band limit the signal that is to be transmitted. The filter 230 can be used to ensure that the transmitted signal fits within desired spectral specifications. Output from the filter 230 can then be provided to an antenna for transmission.

Figure 3:
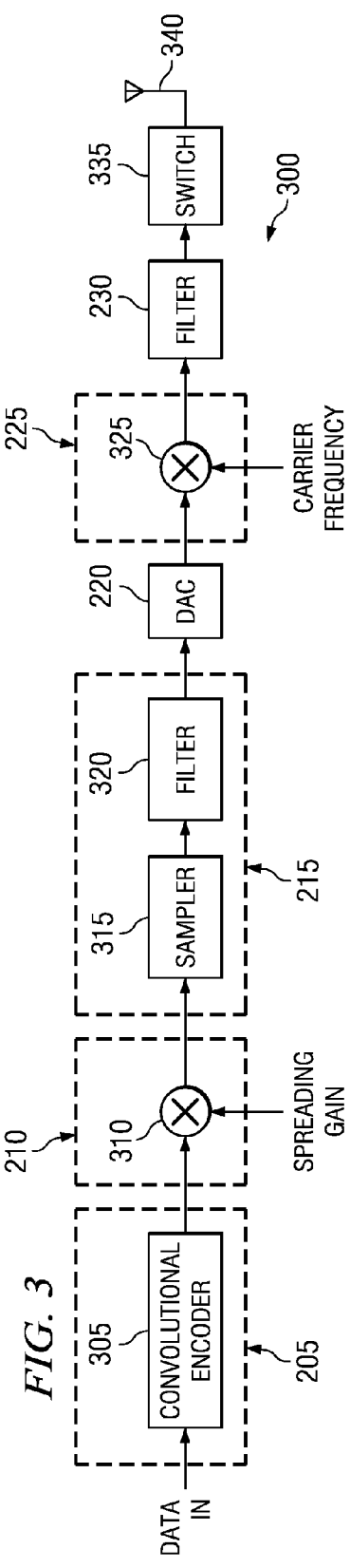
FIG. 3 is a detailed diagram of a portion of a transmitter, wherein the transmitter may be a part of a square-root raised cosine (SRRC) pulse based UWB communications system, according to a preferred embodiment of the present invention.

With reference now to FIG. 3, there is shown a diagram illustrating a detailed view of a transmitter 300, wherein the transmitter 300 may be part of a SRRC pulse based UWB communications system, according to a preferred embodiment of the present invention. The transmitter 300 can be a specific implementation of the receiver 200 (FIG. 2) with specific design decisions made to provide support for the use of a SRRC pulse. The encoding unit 205 (FIG. 2) can be implemented as a convolutional encoder 305. According to a preferred embodiment of the present invention, in order to provide a data rate of 110 Mbps, a convolutional code of rate 11/20 and K=7 can be used. With a data in rate of 110 Mbps, the channel bit rate can then be 200 Mbps. In order to provide a data rate of 220 Mbps or 440 Mbps, a convolutional code of rate 0.63 and K=7 can be used.

The spreading unit 210 (FIG. 2) can be simply implemented as a multiplier 310 which multiplies the convolutionally encoded data stream with a spreading code with an appropriate spreading gain. For example, a spreading code with a spreading gain of 7 can be used in the 110 Mbps system, while spreading codes with spreading gains of 4 and 2 can be used in the 220 and 440 Mbps systems, respectively. After being convolutionally encoded and spread, the data stream can be pulse shaped. The pulse shaping unit 215 (FIG. 2) can comprise an upsampling unit 315 and a filter 320. According to a preferred embodiment of the present invention, the upsampling unit 315 can upsample the data stream by a factor of two, while the filter 320 can give the data stream the desired shape (a SRRC pulse). The filter 320 may have a transfer characteristic as follows: a 3 dB bandwidth of 1.4 GHz and a 20 dB bandwidth of 2.0 GHz. Note that for different shaped pulses and for different frequency characteristics, the filter 320 may have different transfer characteristics.

The DAC 220 (FIG. 2) may be implemented with a high-speed, multi-bit DAC, such as a 4-bit 2.8 Gcps (chips per second) DAC. Once converted into an analog signal, the data stream can be modulated by a mixer 325 which multiplies the analog signal with a carrier frequency (for example, 4.2 GHz carrier frequency for a 1.9 GHz bandwidth SRRC pulse based UWB system with the pulse frequency range of 3.25 to 5.15 GHz). The filter 230 can limit out-of-band signals from being transmitted and can be implemented as a band-pass filter with a pass band from 3.25 to 5.15 GHz. A switch 335 can be used to switch access to an antenna 340 between a receiver (not shown) and the output of the filter 230 so that a single antenna can be used for both transmit and receive duties.

Figures 4, 5A, 5B:
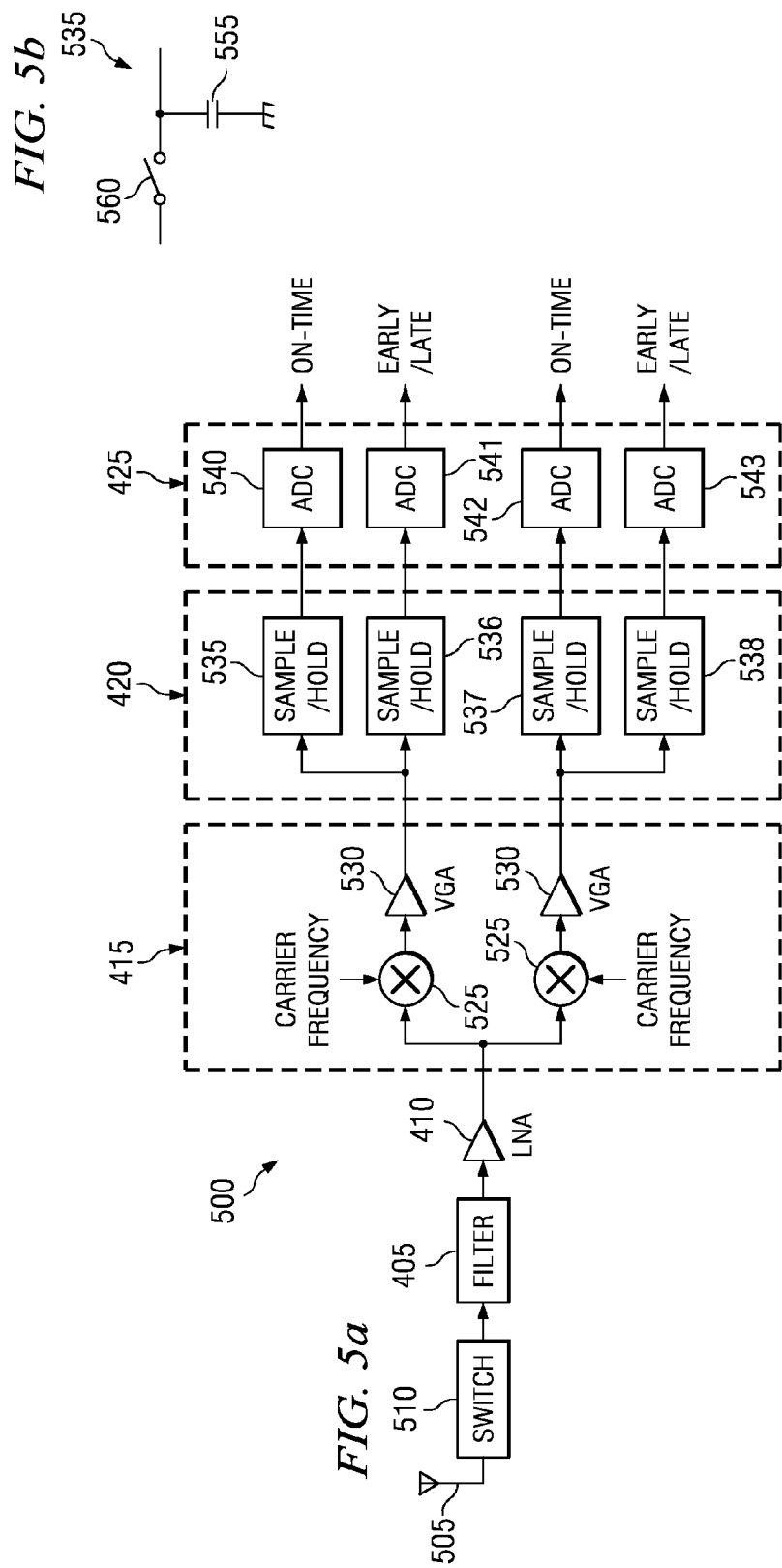
FIG. 4 is a diagram of a portion of a receiver, wherein the receiver may be a part of a square-root raised cosine (SRRC) pulse based UWB communications system, according to a preferred embodiment of the present invention.
FIG. 5a is a detailed diagram of a portion of a receiver, wherein the receiver may be a part of a square-root raised cosine (SRRC) pulse based UWB communications system, according to a preferred embodiment of the present invention.
FIG. 5b is a diagram of a sample/hold circuit, according to a preferred embodiment of the present invention.

With reference now to FIG. 4, there is shown a diagram illustrating a portion of a receiver 400, wherein the receiver 400 may be part of a SRRC pulse based UWB communications system, according to a preferred embodiment of the present invention. A received signal from an antenna can initially be filtered by a filter 405, which can be used to select a particular frequency range from the received signal. This may be needed since the SRRC pulse based UWB communications system does not use the entire UWB frequency band. The filter 405 can also be used to help eliminate out-of-band interference and to ensure that the signal being provided to the remainder of the receiver 400 fits within a particular frequency range. After filtering, the received signal can be amplified by an amplifying unit 410 which can be used to bring signal levels to levels that are compatible with circuitry in the receiver 400.

After amplification, the received signal may be brought down to baseband frequencies by a demodulating unit 415 and then a timing generating unit 420 can be used to help the receiver 400 adjust the timing of its sampling of the received signal to maximize the quality of the received signal. Finally, an analog-to-digital converter (ADC) 425 can be used to convert the analog received signal into a discrete time sample stream that can be provided to a decoder and a despreader so that the data transmitted by a transmitter can be extracted from the received signal.

With reference now to FIG. 5a, there is shown a diagram illustrating a detailed view of a receiver 500, wherein the receiver 500 may be part of a SRRC pulse based UWB communications system, according to a preferred embodiment of the present invention. The receiver 500 can be a specific implementation of the receiver 400 (FIG. 4) with specific design decisions made to provide support for the use of a SRRC pulse. An antenna 505, preferably a wide-band antenna, can be used to receive a signal transmitted over-the-air. The antenna 505 may be switchably coupled to the filter 405 (FIG. 4) by a switch 510, which can be used to permit sharing of the antenna 505 by both the receiver 500 and a transmitter. As described previously, the filter 405 can be used to select a frequency band and to eliminate out-of-band interferers among other functions. According to a preferred embodiment of the present invention, the filter 405 may have a pass band from 3.25 to 5.15 GHz.

The amplifier 410 (FIG. 4), preferably a low-noise amplifier (LNA), can be used to amplify the filtered received signal to a signal level compatible with circuitry in the remainder of the receiver 500. The demodulating unit 415 (FIG. 4) can be used to bring the received signal down to a baseband frequency. According to a preferred embodiment of the present invention, the received signal can be broken into two separate streams, an in-phase stream and a quadrature phase stream. Each stream can be brought down to the baseband frequency by mixers 525 which can multiply each stream with the carrier frequency (4.2 GHz, for example). Each baseband stream can be provided to a variable gain amplifier (VGA) 530, which can be used to help maximize signal quality as part of an automatic gain control loop.

The timing generating unit 420 (FIG. 4) can be used to generate signals to assist the receiver 500 in accurately tracking the received signal. By accurately tracking the received signal, the receiver 500 can maximize the quality of the received signal. The timing generating unit 420 can be implemented from a plurality of sample/hold units (such as sample/hold unit 535), whose function is to hold (sample) a signal at its input for a specified amount of time and to place an equivalent signal at its output. The sample/hold units can be used to provide samples of the two streams (in-phase and quadrature phase) with slightly different timings. For example, the sample/hold unit 535 can be used to provide on-time samples of the in-phase stream while another sample/hold unit 536 can be used to provide early and late samples of the in-phase stream. Similar sample/hold units 537 and 538 can provide similarly timed samples of the quadrature phase stream. The output of each of the sample/hold units can be provided to an ADC (such as ADC 540), which converts the sample into its digital equivalent. The digital values provided by the ADCs may then be provided to a decoder and a despreader. According to a preferred embodiment of the present invention, there can be two different types of ADCs used for the ADCs. The ADCs coupled to the sample/hold units providing the on-time samples (such as sample/hold units 535 and 537), such as ADCs 540 and 542, can have higher resolution (3 bit ADCs, for example), while the ADCs coupled to the sample/hold units providing the early and late samples, such as ADCs 541 and 543, can have lower resolution (1 bit ADCs, for example). Both types of ADCs can operate at a similar conversion rate, such as 1.4 GHz. Note that since the original data that was transmitted was spread via a spreading code prior to transmission and that the early and late samples may only be used to help adjust time tracking, the use of a single bit ADC can be sufficient.

With reference now to FIG. 5b, there is shown diagram illustrating a detailed view of the sample/hold unit 535, according to a preferred embodiment of the present invention. The sample/hold unit 535 may be implemented with a capacitor 555 with a first terminal coupled to substrate ground and a second terminal coupled to signal input. A switch 560 can be used to decouple the capacitor 555 from the signal input. According to a preferred embodiment of the present invention, the size of the capacitor 555 can be adjusted (during manufacturing) to adjust the amount of time that the sample/hold unit 535 holds the input signal. For example, the capacitor 555 may be sized so that the hold time is approximately 357 pico-seconds.

With reference now to FIG. 6, there is shown a diagram illustrating digital baseband circuitry 600 of a receiver, according to a preferred embodiment of the present invention. After being converted into a digital data stream by the ADC 425 (FIG. 4), the received signal may undergo some digital signal processing prior to being in a form (e.g., digital data) that can be usable by digital devices coupled to the receiver 400 (FIG. 4). The digital data stream (from the ADC 425) can be provided to a despreading unit 605, which can be used to remove a spreading code applied to the data stream by the spreading unit 210 (FIG. 2). In addition to removing the spreading code, the despreading unit 605 can also provide timing information to an adjust timing unit 610, which can use the timing information to adjust the operation of the ADC 425 to help improve the quality of the digital data stream.

After being despread, the digital data stream can be provided to a multipath processing unit 615, which can combine multiple copies of the transmitted signal into a single copy with greater signal strength than any of the single copies. A receiver may receive multiple copies of the transmitted signal when reflections of the transmitted signal (the reflections may come from buildings, mountains, and other large objects) are received at the receiver at different times. This is commonly referred to as multipath and is considered to be well known by those of ordinary skill in the art of the present invention. After multipath processing, the digital data stream can then be decoded by a decoding unit 620. The decoding unit 620 can be used to extract the data from the digital data stream which was previously encoded (for example, by the encoding unit 205). The data can then be checked for errors.

With reference now to FIG. 7, there is shown a diagram illustrating a detailed view of digital baseband circuitry 700 of a receiver, according to a preferred embodiment of the present invention. The digital baseband circuitry 700 can be a specific implementation of the digital baseband circuitry 600 (FIG. 6) with specific design decisions made to provide support for the use of a SRRC pulse. The despreading unit 605 (FIG. 6) may be implemented as two despreaders 705 and 706. The two despreaders 705 and 706 can be used to despread the on-time and the early and late samples of the digital data stream, with the despreader 705 to despread the on-time samples while the despreader 706 despreads the early and late samples. According to a preferred embodiment of the present invention, the despreaders 705 and 706 can process samples from both digital streams (the in-phase and the quadrature phase streams).

The despreaders 705 and 706 can provide timing information to a time tracking unit 720, which can make use of the timing information (both on-time and early/late information) to make adjustments to sampling control of the ADC 425. The despreader 705 can provide sample information about the on-time samples to an automatic gain control (AGC) unit 710, which can make use of the samples to adjust gain of the VGA 530 (FIG. 5*a*). The despreader 705, the AGC unit 710, and the VGA 530 can comprise an automatic gain control loop that can help ensure that a desired magnitude is maintained for the samples of the digital stream.

The output of the despreader 705 can also be provided to the multipath processing unit 615 (FIG. 6). The multipath processing unit 615 can be made up of a rake receiver 725, a channel estimation unit 730, and a carrier phase tracking unit 735. The rake receiver 725 can have multiple tracking fingers that can independently demodulate copies of the transmitted signal present in the digital streams. Each finger can be assigned a different timing offset provided by the channel estimation unit 730, which may be used to provide a delay spread profile of the communications channel. The carrier phase tracking unit 735 can be used to provide phase error information, which can be used to make adjustments to the fingers of the rake receiver 725.

The output of the rake receiver 725 is a combination of each finger's output (which can have better quality than any one of the finger's outputs). The combination of each finger's outputs can be a simple sum of the outputs, a weighted sum of the outputs, or so forth. The output of the rake receiver 725 can then be provided to the decoding unit 620, which, according to a preferred embodiment of the present invention can implement a Viterbi decoding algorithm (a Viterbi decoder 740). The output of the decoding unit 620 can then be checked for errors, for example, by checking cyclic redundancy codes (CRCs).

An equalizer 745 can be optionally placed in between the output of the rake receiver 725 and the decoding unit 620. The presence of the equalizer 745 can help to improve the performance for higher data rates (440 Mbps, for example), where the spreading gain can be very small and inter-symbol interference (ISI) can place a limit upon the performance of the communications system. The equalizer 745 can be a linear equalizer, a decision feedback equalizer (DFE), a reduced-state sequence estimator (RSSE), a maximum-likelihood sequence estimator (MLSE), or so forth. The equalizer 745 can be adaptive (wherein coefficients of the equalizer 745 can be updated periodically during a payload portion of a packet) or non-adaptive (wherein coefficients of the equalizer 745 are frozen after the training period).

At a base data rate of 110 Mbps, the data that is to be transmitted may be spread with a spreading sequence of length seven (7). A typical way of achieving the spreading sequence is to use a short code sequence with a periodicity that can be equal to the spreading gain (seven in this example).

With reference now to FIGS. 8*a* and 8*b*, there are shown diagrams illustrating power spectral density graphs 805 and 810 for a spreading sequence with a short and a long period, according to a preferred embodiment of the present invention. The power spectral density (PSD) graph 805 is for an extended Barker sequence of length 15, shaped by an SRRC pulse and modulated to a center frequency of 5.5 Ghz. Note that a PSD graph for a Barker sequence of length seven that has been shaped and modulated would have a similar general overall appearance as the PSD graph 805 with more pronounced ripples. The PSD graph 805 illustrates strong spectral shaping at certain frequencies. To both maximize a total transmit power and to comply with technical and regulatory constraints, a PSD graph should be as flat as possible. In order to help flatten the PSD of a spreading sequence, a long sequence with a periodicity that is much greater than the spreading gain needed to spread the transmitted data can be used. The PSD graph 810 is for a Barker sequence with a length that is greater than 15. Note that the same general appearance with smaller ripples.

As discussed previously, interference from (and to) UNII devices can be a major source of concern. Therefore, mitigating the interference of an UNII interferer is of great significance. The UNII band approximately spans a frequency band from 5.15 to 5.85 GHz. The typical transmit power of a UNII interferer can be much greater (more than 40 dB) than receiver sensitivity level for a UWB communications system. This can present problems for a LNA of a UWB receiver. A relatively simple solution would be to include a band-pass filter to reject UNII interference prior to the LNA. However, the use of the band-pass filter wastes available bandwidth if there is no UNII interference present. The use of parallel signal paths which can include the band-pass filter when UNII interference is present and by-pass the band-pass filter when UNII interference is not present can be used to help limit loss of bandwidth. However, even further elimination of the UNII interference may be needed to meet technical requirements.

With reference now to FIG. 9, there is shown a diagram illustrating UNII interference mitigating circuitry 900, according to a preferred embodiment of the present invention. The use of a simple parallel signal path to introduce a band-pass filter when UNII interference is detected can help eliminate waste of available bandwidth when UNII interferers are not present. Note that interference in other frequency ranges can be mitigated in a similar way and that the UNII band is used as an example. However, some technical requirements may not be met unless further elimination of UNII interferers is performed.

Further elimination of UNII interference can be achieved with use of the mitigating circuitry 900. Output of an LNA can be down-converted by mixing with a carrier (by a mixer 905), wherein the carrier may have a center frequency of approximately 5.5 GHz (for use with UNII interferers). The down-conversion can result in the UNII interferer being moved down into a baseband frequency range of from −350 MHz to +350 MHz. A high-pass filter (HPF) 910 can then be used to eliminate the UNII interferer. The HPF 910 may be desired since it can potentially achieve a better rejection than a band-pass filter (even when filters of comparable order are used). This may be due to the fact that the HPF 910 is operating in the baseband while a band-pass filter would be operating in the passband. Note that for other interferers, a different carrier frequency and high-pass filter can be used in place of the ones discussed above. Output of the HPF 910 can then be amplified by a variable gain amplifier (VGA) 915. After amplification, the output can be sampled (by a sample and hold circuit 920). Finally, an analog-to-digital converter (ADC) 925 can convert the sampled output into a digital data stream.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An ultra-wideband receiver comprising:
a filter coupled to a signal input, the filter to pass signals in a frequency band from a received signal provided by the signal input;
an amplifier coupled to the filter, the amplifier to bring the passed signals to a signal level compatible with circuitry in the receiver;
a demodulating unit coupled to the amplifier, the demodulating unit containing circuitry to bring the passed signals to an internal frequency, thereby providing a demodulated signal at an output of the demodulating unit;
a timing generating unit coupled to the demodulating unit, the timing generating unit containing circuitry to generate samples of the demodulated signal at different timing offsets, wherein the timing generating unit comprises a pair of sample/hold circuits having inputs coupled to the output of the demodulating unit, and wherein a first sample/hold circuit produces an on-time sample of the demodulated signal and a second sample/hold circuit produces an early and a late sample of the demodulated signal; and
a converter coupled to the timing generating unit, the converter to convert continuous samples produced by the timing generating unit into discrete samples.

2. The ultra-wideband receiver of claim 1, wherein the demodulating unit further contains circuitry to provide, at separate outputs, in-phase and quadrature phase signal streams from the passed signals.

3. The ultra-wideband receiver of claim 2, wherein the demodulating unit further contains amplifiers to variably adjust gains of the in-phase and quadrature phase signal streams.

4. The ultra-wideband receiver of claim 1, wherein the demodulating unit provides in-phase and quadrature phase signal streams at separate outputs, wherein the pair of sample/hold circuits are coupled to the in-phase signal stream, and wherein the timing generating unit further comprises a second pair of sample/hold circuits coupled to the quadrature phase signal stream.

5. The ultra-wideband receiver of claim 1, wherein the timing generating unit produces on-time, early, and late samples, and wherein the converter comprises a pair of analog-to-digital converters (ADC), wherein a first ADC converts the on-time samples and a second ADC converts the early and late samples.

6. The ultra-wideband receiver of claim 5, wherein the first ADC has a higher resolution than the second ADC.

7. The ultra-wideband receiver of claim 1 further comprising an interference mitigating circuit having an input coupled to the amplifier and an output coupled to the demodulator, the interference mitigating circuit comprising:
a down-conversion unit to bring an interference band within the received signal down to baseband; and
a high-pass filter coupled to the down-conversion unit, the high-pass filter to eliminate the interference band located at baseband.

8. The ultra-wideband receiver of claim 7, wherein there is an interferer located within a frequency band of 5.15 GHz to 5.85 GHz, wherein the down-conversion unit is a mixer with a carrier frequency of approximately 5.5 GHz, and wherein the high-pass filter has a cutoff frequency at approximately 350 MHz.

9. The ultra-wideband receiver of claim 1, wherein the received signal is a square-root raised cosine (SRRC) pulse-based signal located in the frequency band of the filter.

10. An ultra-wideband receiver comprising:
a filter coupled to a signal input, the filter to pass signals in a frequency band from a received signal provided by the signal input;
an amplifier coupled to the filter, the amplifier to bring the passed signals to a signal level compatible with circuitry in the receiver;
a demodulating unit coupled to the amplifier, the demodulating unit containing circuitry to bring the passed signals to an internal frequency;
a timing generating unit coupled to the demodulating unit, the timing generating unit containing circuitry to generate samples of the passed signals at different timing offsets;
a converter coupled to the timing generating unit, the converter to convert continuous samples produced by the timing generating unit into discrete samples;
a despreading unit to remove a spreading code applied to a transmitted signal;
an adjust timing circuit coupled to the despreading unit, the adjust timing circuit containing circuitry to control sampling of the converter;
a multipath processing unit coupled to the despreading unit, the multipath processing unit containing circuitry to combine multiple copies of the transmitted signal in the signals into a single signal; and
a decoding unit coupled to the multipath processing unit, the decoding unit containing circuitry to remove encoding present in the single signal.

11. The ultra-wideband receiver of claim 10, wherein the despreading unit comprises a pair of despreaders, one for an in-phase and one for a quadrature phase signal stream.

12. The ultra-wideband receiver of claim 10, wherein the despreading unit further provides timing information.

13. The ultra-wideband receiver of claim 12, wherein the adjust timing circuit uses timing information from the despreading unit to adjust converter sampling.

14. The ultra-wideband receiver of claim 10 further comprising an automatic gain control (AGC) coupled to the despreading unit, wherein the AGC controls amplifiers to variably adjust the gain of the signal stream.

15. The ultra-wideband receiver of claim 10, wherein the multipath processing unit comprises:
a rake receiver containing a plurality of tracking fingers, each tracking finger to independently track a copy of the transmitted signal;
a channel estimation unit coupled to the rake receiver, the channel estimation unit containing circuitry to provide a delay spread profile of the received signal; and
a carrier phase tracking unit coupled to the rake receiver, the carrier phase tracking unit containing circuitry to provide phase error information.

16. The ultra-wideband receiver of claim 10, wherein the decoding unit implements a Viterbi decoder.

17. The ultra-wideband receiver of claim 10 further comprising an equalizer coupled to the multipath processing unit and the decoding unit, the equalizer to help mitigate inter-symbol interference.

18. The ultra-wideband receiver of claim 17, wherein the equalizer is an adaptive equalizer.

19. The ultra-wideband receiver of claim 17, wherein the equalizer is a non-adaptive equalizer.

20. The ultra-wideband receiver of claim 10, wherein the received signal is a square-root raised cosine (SRRC) pulse-based signal located in the frequency band of the filter.

21. An ultra-wideband device comprising:
an antenna to transmit and receive signals;
a switch coupled to the antenna, the switch to control access to the antenna;
a receiver coupled to the switch, the receiver comprising
  a filter coupled to the switch, the filter to pass signals in a frequency band from a received signal provided by the switch;
  an amplifier coupled to the filter, the amplifier to bring the passed signals to a signal level compatible with circuitry in the receiver;
  a demodulating unit coupled to the amplifier, the demodulating unit containing circuitry to bring the passed signals to an internal frequency, thereby providing a demodulated signal at an output of the demodulating unit;
  a timing generating unit coupled to the demodulating unit, the timing generating unit containing circuitry to generate samples of the demodulated signal at different timing offsets, wherein the timing generating unit comprises a pair of sample/hold circuits having inputs coupled to the output of the demodulating unit, and wherein a first sample/hold circuit produces an on-time sample of the demodulated signal and a second sample/hold circuit produces an early and a late sample of the demodulated signal; and
  a converter coupled to the timing generating unit, the converter to convert continuous samples produced by the timing generating unit into discrete samples;
the ultra-wideband device further comprising a transmitter coupled to the switch, the transmitter comprising
  an encoding unit coupled to a data source, the encoding unit containing circuitry to apply a code to data provided by the data source;
  a spreading unit coupled to the encoding unit, the spreading unit containing circuitry to apply a spreading code to the data;
  a pulse shaping unit coupled to the spreading unit, the pulse shaping unit containing circuitry to apply a mask of a desired pulse with desired frequency characteristics to the encoded and spread data;
  a modulating unit coupled to the pulse shaping unit, the modulating unit to apply a carrier frequency to the shaped, encoded, and spread data; and
  a filter coupled to the modulating unit and the switch, the filter to ensure that the modulated, shaped, encoded, and spread data fit within a desired frequency range.

22. The ultra-wideband device of claim 21, wherein the desired pulse is a square-root raised cosine (SRRC) pulse.

23. The ultra-wideband device of claim 22, wherein the SRRC pulse has a frequency bandwidth that is a fraction of available ultra-wideband bandwidth.

24. The ultra-wideband receiver of claim 22, wherein the received signal is an SRRC pulse-based signal located in the frequency band of the filter.

25. The ultra-wideband device of claim 21, wherein the device avoids transmitting in frequency bands of known interferers.

26. The ultra-wideband device of claim 25, wherein the device transmits in the frequency bands of known interferers when they are absent.

27. The ultra-wideband device of claim 21, wherein the device transmits in a portion of available ultra-wideband bandwidth, and wherein when multiple ultra-wideband devices are present, each ultra-wideband device can transmit in a different portion of the ultra-wideband bandwidth.

* * * * *